United States Patent

Nerwin

[15] 3,648,585
[45] Mar. 14, 1972

[54] PHOTOGRAPHIC FILM PACKS

[72] Inventor: Hubert Nerwin, Rochester, N.Y.

[73] Assignee: Eastman Kodak Company, Rochester, N.Y.

[22] Filed: June 12, 1970

[21] Appl. No.: 45,686

[52] U.S. Cl....................................................95/19, 95/13
[51] Int. Cl..........................................................G03b 17/52
[58] Field of Search..........................................95/13, 19, 22

[56] References Cited

UNITED STATES PATENTS

| | | | |
|---|---|---|---|
| 2,930,299 | 3/1960 | Land | 95/22 X |
| 2,978,971 | 4/1961 | Eburn | 95/13 |
| 1,103,417 | 7/1914 | Hopkins | 95/22 |
| 3,033,091 | 5/1962 | Eloranta | 95/19 X |
| 2,903,951 | 9/1959 | Land | 95/19 |

Primary Examiner—John M. Horan
Assistant Examiner—Alan A. Mathews
Attorney—Robert W. Hampton and J. Addison Mathews

[57] ABSTRACT

The disclosure relates to photographic film packs containing a plurality of self-processing film units adapted to be exposed and withdrawn from the film pack in sequence. A novel arrangement of restraining tabs provided by the leader members of the respective film units insures proper sequential withdrawal of the film units and prevents the removal of each successive unit from effecting movement of any of the remaining units.

7 Claims, 4 Drawing Figures

Patented March 14, 1972

3,648,585

HUBERT NERWIN
INVENTOR.

BY J. Addingmathew
Robert W. Hampton
ATTORNEYS

PHOTOGRAPHIC FILM PACKS

BACKGROUND OF THE INVENTION

1. Field of the Invention

The present invention relates to photography and more particularly to film packs containing a plurality of self-processing film units adapted to be exposed and withdrawn from the film pack in sequence.

2. Description of the Prior Art

A film pack of the type to which the present invention is directed comprises a folded assemblage of stacked film units located within an appropriate housing. Each such film unit includes a film sheet and an image transfer or cover sheet. When the film pack is installed in a camera, the film sheets initially are in superimposed relation to each other behind the camera's lens system so that each such sheet can be exposed after the preceding one is moved out of exposure position. After each film sheet has been exposed, it is moved into sandwiched relation with the corresponding cover sheet and a layer of processing fluid is distributed between the two sheets to initiate development of the exposed image and to cause it to transfer to the cover sheet, whereupon the continuing movement of the film unit removes it from the camera.

Typically, superimposed leader members are attached to the respective film units and are accessible from the exterior of the camera and can be manually withdrawn to effect sequential processing and removal of those units. As each film unit is moved, however, it is essential that the other film units remain in place. Accordingly, the superimposed trailing ends of the film units are generally stapled to each other and to a pressure plate member within the film pack housing so that only the film unit being withdrawn will tear free of the staple. The film assemblage is folded between the film sheets and the cover sheets so that those sheets are generally parallel to each other. Therefore, if the trailing ends of the film units are so attached to the pressure plate member, the force that must be applied to the film unit being withdrawn is significantly greater than that required to tear its trailing end free of the housing because of the substantial friction developed between that film unit and the adjacent film unit. Consequently, considerable effort must be exerted to withdraw the successive film units which must be stronger and more securely attached to its housing element than would otherwise be necessary. Furthermore, such an arrangement does not necessarily insure that the film units can be withdrawn only in proper sequence.

The present invention relates to film packs of the same general type just discussed but provides simple and reliable means for insuring sequential withdrawal of the film units therefrom and also for releasably anchoring the leader members of the film units adjacent the opening through which they emerge from the film pack housing so that the force required to free each successive film unit does not substantially increase the frictional engagement between the film and cover sheep portions of that unit and the corresponding portions of the succeeding unit. Briefly, this is accomplished in accordance with the invention by providing the superimposed leader members with aligned integral anchoring tabs which are folded in approximately right angle relation to the leader members in superimposed relation to each other. The superimposed anchoring tabs are sandwiched between an inner surface of the housing wall that defines the opening for the leader members and the adjacent end surface of the pressure plate structure. Accordingly, the leader members cannot be withdrawn in improper sequence but can be removed individually in proper sequence in opposition to the frictional engagement of their respective anchoring tabs without danger of also moving one or more of the remaining film units. The trailing ends of the film units generally need not be attached to the pressure plate but if such connection is desired it can be relatively insecure, thus minimizing the force required to withdraw the successive film units.

Various means for practicing the invention and other advantages and novel features thereof will be apparent from the following detailed description of illustrative preferred embodiments of the invention, reference being made to the accompanying drawings in which like reference characters denote like elements.

DESCRIPTION OF THE PREFERRED EMBODIMENT

Figure 1:
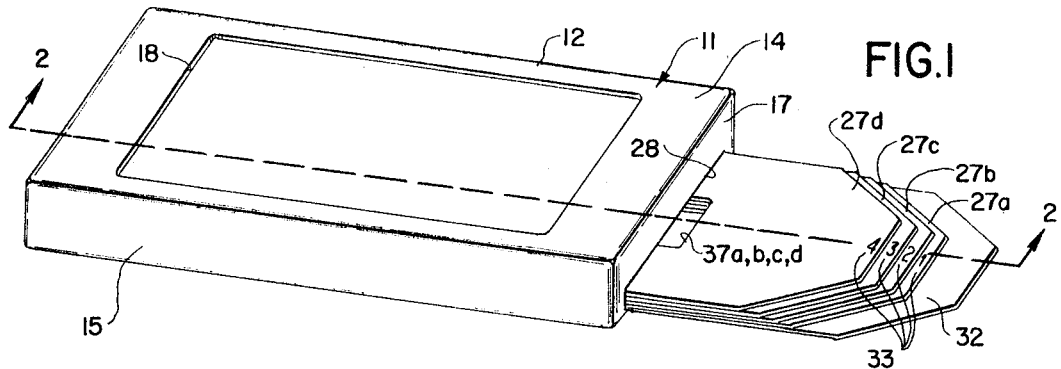
FIG. 1 is a perspective view of a film pack according to the present invention.

As best illustrated by FIG. 1 of the accompanying drawings, a film pack 11 of the type to which the present invention relates comprises a box-like housing 12 which is illustrated as if it were lying on its flat back wall member 13. A front wall member 14 is supported in parallel relation to the back wall member by side walls 15 and by end walls 16 and 17 and is provided with a rectangular exposure window 18. A pressure plate assembly 19 within housing 12 comprises a flat front pressure plate 21 provided with a curved end portion 22 adjacent housing end wall 16 and a flat back pressure plate 23 including an end lip 24 adjacent and parallel to housing end wall 17. A resilient leaf spring 25 connects the two pressure plates in generally parallel relation to each other and urges them apart to bias the front plate forwardly and the back plate rearwardly.

Figure 2:
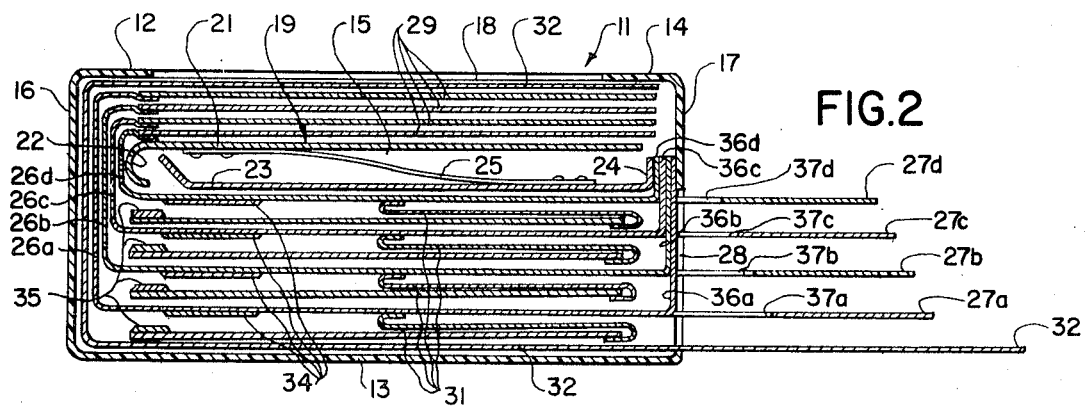
FIG. 2 is a somewhat schematic cross-sectioned side elevational view of the film pack shown in FIG. 1 greatly exaggerated in thickness to depict the construction and arrangement of the film units and the pressure plate structure within the film pack housing.

By reference to FIG. 2, the film unit assemblage of the illustrative film pack will be seen to include four film units 26a–26 comprising respective superimposed elongate leader members 27a–27d which are made of heavy paper or the like and which extend through a slot 28 in end wall 17 of the housing. The trailing ends of the leader members are folded past the curved end of pressure plate 21 and are attached to respective film sheets 29 provided with photosensitive surfaces facing window 18 in the front wall member of the housing. Additionally, a flexible connecting web 31 is attached to each pulling leader and also to the leading end of a corresponding cover or image transfer sheet located behind the pressure plate assembly. Initially, the film pack is also provided with an opaque masking strip 32 located adjacent the outermost film unit and covering exposure window 18 to prevent light from reaching the film sheets. Like the leading ends of the leader members, the leading end of the masking strip also extends through slot 28 so that it is likewise accessible from the exterior of the film pack housing.

As is well known in the prior art, a camera adapted to accommodate the illustrative film pack includes appropriate means for preventing light from reaching the film pack exposure window 18 except through the camera lens and shutter.

The superimposed leading ends of the masking strip and the leader members extend between a pair of rollers or the like incorporated in the camera and are accessible from the exterior of the camera housing. After the film pack has been loaded into the camera, the photographer grasps the leading end of the masking strip and withdraws the latter from the camera. When the masking strip is thus removed, the resilient forward to rearward expansion of the pressure plate assembly biases the margins of the forwardmost film sheet into contact with the inner surface of wall member 14 to position the photosensitive surface of that sheet in coincidence with a focal plane of the camera lens system.

The leading ends of the leader members are provided with reference numerals 33 or the equivalent to indicate the exposure sequence of the respective film sheets and are progressively shorter to facilitate grasping them in that sequence. After the first available film sheet has been exposed, the photographer slowly withdraws the corresponding leader member and thereby moves that sheet behind the pressure plate assembly so that its exposed surface faces the forward surface of the corresponding cover sheet. This movement of the film sheet absorbs all of the slack in the connecting web, thereby causing the film sheet and the cover sheet to move together between the pressure rollers as the film unit is removed from the camera by the continuing withdrawal of its leader member. A processing fluid pod 34 is attached to each leader member adjacent the leading ends of the corresponding film sheet and cover sheets when the former has moved into alignment with the latter. When the processing fluid pod is drawn between the pressure rollers, processing fluid is squeezed out of the pod and is distributed between the film sheet and the cover sheet as those sheets pass between the rollers. An absorber pad or trap 35 at the trailing end of the cover sheet is adapted to absorb excess processing fluid to prevent continuation of the remaining film units. Upon coming into contact with the film sheet, the processing fluid initiates development of the exposed image therein and causes that image to transfer to the cover sheet, which can later be peeled away to provide the finished photograph. After each succeeding film unit has been exposed, it is removed and automatically processed in the same manner. Specific details of the construction and additional functions of the various elements comprising the illustrative film units and alternate embodiments thereof have been omitted from the present disclosure because such details are not necessary to understanding the present invention and are readily available from numerous prior art references relating to analogous self-processing film units.

Figure 3:
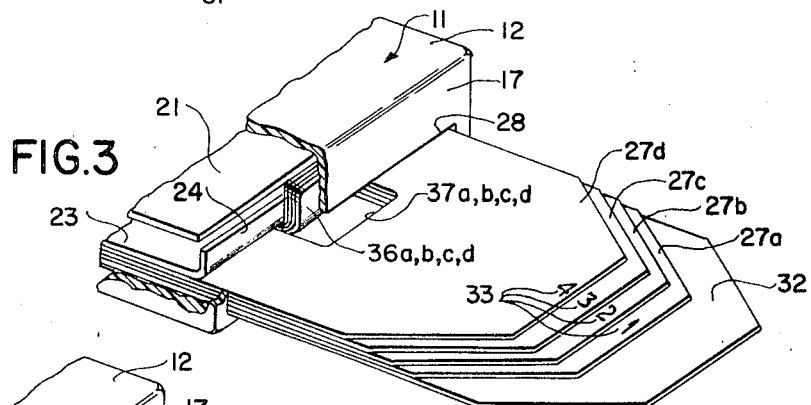
FIG. 3 is a fragmentary perspective view of the film pack depicted in FIGS. 1 and 2 shown partially broken away to illustrate the anchoring tabs associated with the respective film units.

As previously summarized, the present invention is directed to insuring the withdrawal of the film units in proper sequence and to preventing an unexposed film unit from being moved by the withdrawal of the preceding exposed film unit or the masking strip. In accordance with the preferred embodiment of the invention illustrated by FIGS. 1-3, this objective is accomplished by providing the respective leader member with integral anchoring tabs 36a-36d, which are formed simply die cutting a U-shaped incision through each leader member to define a tab or ear that can be folded out of the plane of the surrounding leader material. During the assembly of the film pack, the film units are stacked in proper sequence with their respective tabs or ears in mutual alignment, whereupon the latter are folded in unison so that they extend forwardly from the leader members in superimposed relation to each other adjacent the resulting aligned leader member openings 37a-37. When the film assemblage is installed in the film pack housing, the anchoring tabs are sandwiched between the inner surface of end wall 17 adjacent slot 28 and the forwardly bent lip 24 of back pressure plate 23. By reference to FIG. 2, it will be apparent that anchoring tab 36a of the first available film unit projects through openings 37b, 37c and 37d in the corresponding leader members 27b, 27c and 27d of the subsequently available film units. Similarly, anchoring tabs 36b projects through openings 37c and 37d and anchoring tab 36c projects through opening 37d.

After the film pack is loaded into the camera, the masking strip is withdrawn while the film units are returned in place by the sandwiched engagement of their anchoring tabs between the housing end wall and the end lip of the pressure plate assembly, which increases its grip on the tabs in response to the withdrawing force exerted on the masking strip. When the film sheet of film unit 26a has been exposed, the withdrawal of leader member 27a pulls its anchoring tab 36a out of engagement between anchoring tab 36b and housing wall 17 and folds it back against the adjacent face of that leader member below leader member 27b as it emerges through slot 28. During the initial movement of leader member 26a, frictional force tending to cause anchoring tab 36b to move with anchoring tab 36a is overcome by the bending resistance of tab 36b; thereby causing the latter to remain in its original position in which it prevents movement of film unit 26b until the removal of film unit 26a is completed. The anchoring tabs of the remaining film units obviously cooperate in the same manner as each succeeding film unit is withdrawn, thus insuring that only the exposed film unit is moved from its original position. If desired, it is also possible to provide the masking strip with a similar anchoring tab, which is initially sandwiched between tab 36a and housing wall 17.

If the photographer should attempt to pull the wrong leader member, its movement will be strongly resisted by the anchoring tabs of the preceeding film units extending through the opening 37 therein, thus alerting him of his mistake. Accordingly, it will be seen that the present invention substantially insures proper sequential removal by the successive film units and reduces the force required for that purpose while at the same time simplifying the construction and assembly of the film pack.

Figure 4:
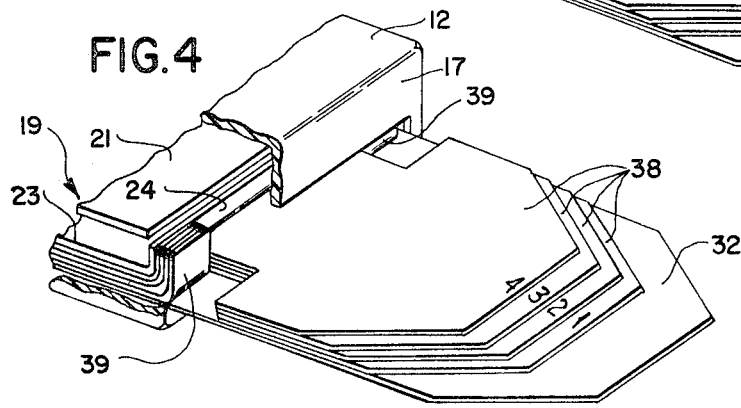
FIG. 4 corresponds generally to FIG. 3 but illustrates an alternate embodiment of anchoring tabs.

The embodiment of the invention shown in FIG. 4 functions in the same manner described above and is illustrated in conjunction with the same film pack housing 12 and pressure plate assembly 19. In accordance with this embodiment, however, each of the four illustrative leader members 38 is provided with two anchoring tabs 39 formed at the opposite edges thereof by die-cut L-shaped incisions.

Although the foregoing disclosure is directed to specific illustrative embodiments, it should be recognized that the invention is equally applicable to other types of conventional or self-processing film packs including those in which the removal of each subsequent film unit brings the leader member of the next unit to an accessible position.

The invention has been described in detail with particular reference to a preferred embodiment thereof, but it will be understood that variations and modifications can be effected within the spirit and scope of the invention.

I claim:

1. In a film pack comprising:
   a box-like casing provided with an elongate leader slot and with an exposure window;
   a first film sheet initially located within said casing in alignment with said exposure window, said first film sheet including a layer of photosensitive material for recording a processable latent image;
   a second film sheet initially located within said casing in alignment with said first film sheet, said second film sheet including a layer of photosensitive material for recording a processable latent image;
   pressure plate means resiliently biasing said film sheets toward said exposure window;
   a first elongate flexible leader member connected to said first film sheet and initially positioned with its leading end portion extending through said leader slot;
   a second elongate flexible leader member connected to said second film sheet and initially positioned with its leading end portion adjacent the initial position of the leading end portion of said first leader member;
   The improvement comprising:
   means defining an opening in the leading end portion of one of said leader members, and
   means providing the leading end portion of said other leader member with a first anchoring tab which initially extends through said opening in said one leader member within said casing.

2. The invention defined by claim 1 in which said first anchoring tab defines a tip extending through said opening, said tip initially being positioned in normal relation to the leading end portion of the leader member from which it extends and being positioned adjacent an internal surface of said casing bordering said slot.

3. The invention defined by claim 1 in which said first anchoring tab comprises an ear defined by an incision in the leading end portion of said leader member from which it extends, said ear being folded out of the plane said last-mentioned leading end portion.

4. The invention defined by claim 2 in which said other leader member is provided with a second anchoring tab corresponding to said first anchoring tab, said second anchoring tab being initially positioned in facial engagement with the tip portion of said first anchoring tab extending through said opening in said one leader member.

5. The invention defined by claim 4 in which said first and second anchoring tabs are initially sandwiched between said internal surface of said casing and a surface defined by the adjacent end of said pressure plate means.

6. The invention defined by claim 3 in which said first anchoring tab is located along an imaginary longitudinal center line of said first leader member.

7. The invention defined by claim 1 in which said other leader member is provided with two of such first anchoring tabs located at opposite edges thereof in transverse alignment with each other.

* * * * *